(12) United States Patent
van der Haar et al.

(10) Patent No.: US 8,116,740 B2
(45) Date of Patent: Feb. 14, 2012

(54) MOBILE COMMUNICATION TERMINAL AND METHOD

(75) Inventors: Rob van der Haar, Helsinki (FI); Juha Hemanus, Helsinki (FI); Akseli Anttila, Helsinki (FI); Valerie Pegon, London (GB); Harri Wikberg, Helsinki (FI)

(73) Assignee: Nokia Corporation (FI)

( * ) Notice: Subject to any disclaimer, the term of this patent is extended or adjusted under 35 U.S.C. 154(b) by 386 days.

(21) Appl. No.: 11/232,413

(22) Filed: Sep. 21, 2005

(65) Prior Publication Data

US 2007/0066283 A1 Mar. 22, 2007

(51) Int. Cl.
*H04M 1/725* (2006.01)

(52) U.S. Cl. ............... 455/412.2; 455/567; 455/466; 455/458; 379/88.12; 709/203; 709/206

(58) Field of Classification Search .................. 455/567, 455/466, 566, 415, 412.1–414.4, 458; 345/2.3; 379/418, 88.12; 340/384.1; 709/203–206
See application file for complete search history.

(56) References Cited

U.S. PATENT DOCUMENTS

| | | | | |
|---|---|---|---|---|
| 4,962,532 | A * | 10/1990 | Kasiraj et al. ...................... | 726/6 |
| 5,742,668 | A * | 4/1998 | Pepe et al. ...................... | 455/415 |
| 5,797,099 | A * | 8/1998 | Ejzak et al. ...................... | 455/466 |
| 6,035,104 | A * | 3/2000 | Zahariev ...................... | 709/203 |
| 6,134,454 | A * | 10/2000 | Foladare et al. ............ | 455/556.2 |
| 6,630,883 | B1* | 10/2003 | Amin et al. ................... | 340/7.29 |
| 6,947,396 | B1* | 9/2005 | Salmi ............................. | 370/310 |
| 6,959,207 | B2* | 10/2005 | Keinonen et al. ............. | 455/567 |
| 7,353,015 | B1* | 4/2008 | Tenhunen .................. | 455/412.2 |
| 7,660,609 | B2* | 2/2010 | Karan et al. ................... | 455/567 |
| 2001/0032247 | A1* | 10/2001 | Kanaya .......................... | 709/206 |
| 2003/0172108 | A1* | 9/2003 | Paul et al. ...................... | 709/203 |
| 2004/0085259 | A1* | 5/2004 | Tarlton et al. .................. | 345/2.3 |
| 2004/0088358 | A1 | 5/2004 | Boda et al. | |
| 2004/0121818 | A1* | 6/2004 | Paakkonen .................... | 455/567 |
| 2004/0172454 | A1 | 9/2004 | Appelman et al. | |
| 2004/0208301 | A1* | 10/2004 | Urban et al. .............. | 379/142.17 |
| 2007/0293195 | A1* | 12/2007 | Angwin et al. ............ | 455/412.2 |
| 2009/0036102 | A1* | 2/2009 | Ho .............................. | 455/412.2 |

FOREIGN PATENT DOCUMENTS

| | | |
|---|---|---|
| JP | 2002-278891 | 9/2002 |
| JP | 2004-289577 | 10/2004 |
| JP | 2005-228249 | 8/2005 |

(Continued)

OTHER PUBLICATIONS

U.S. Appl. No. 10/932,544, filed Sep. 2, 2004, Montebovi, et al.

(Continued)

*Primary Examiner* — Sharad Rampuria
(74) *Attorney, Agent, or Firm* — Alston & Bird LLP

(57) ABSTRACT

A method in electronic messaging in a mobile telecommunications network for mobile communication terminals is disclosed. The method involves, in a sender terminal, the steps of generating an electronic message, associating the electronic message with a message notification, and representing the electronic message and the message notification in a signal which is transmittable over the mobile telecommunications network to a receiver terminal. The signal is adapted, when received in the receiver terminal, for performance of the message notification in a user interface of the receiver terminal as a notification of the reception of the electronic message. Further disclosed are an associated method in a receiver terminal, and a sender terminal and a receiver terminal capable of performing the respective method, as well as a system including such sender and receiver terminals.

26 Claims, 5 Drawing Sheets

FOREIGN PATENT DOCUMENTS

| | | | | |
|---|---|---|---|---|
| KR | 2003-18389 | | | 3/2003 |
| KR | 2005037070 | A | * | 4/2005 |
| KR | 1020050037070 | A | | 4/2005 |
| KR | 1020050045779 | A | | 5/2005 |
| WO | WO-2004/040461 | A1 | | 5/2004 |
| WO | 2005/064895 | | | 7/2005 |
| WO | 2005091578 | A1 | | 9/2005 |
| WO | 2006034952 | A1 | | 4/2006 |

OTHER PUBLICATIONS

Office Action issued on corresponding Korean Patent Application No. 2008-7009533, dated Mar. 9, 2010.

Korean Office Action dated Nov. 24, 2010.

Japanese Office Action dated Dec. 1, 2010.

Ito Masatoshi., Hiranoya Nobukatsu., Oh! PC. vol. 19 No. 3, p. 123-131(2000).

Japanese Office Action dated Apr. 12, 2011.

"3GPP TS 24.011 V6.1.0 (Jun. 2005)—$3^{rd}$ Generation Partnership Project; Technical Specification Group Core Network and Terminals; Point-to-Point (PP) Short Message Service (SMS) Support on Mobile Radio Interface (Release 6)" [online] [retrieved Jul. 25, 2011]. Retrieved from the Internet: <http://www.3gpp.org/ftp/Specs/archive/24_series/24.011/24011-610.zip>. 105 pages.

International Search Report dated Jun. 18, 2007.

Written Opinion dated Jun. 18, 2007.

* cited by examiner

Changing personal notification at receiver's side

MOBILE COMMUNICATION TERMINAL AND METHOD

FIELD OF THE INVENTION

The present invention generally relates to messaging in mobile telecommunications, and more particularly to improved methods and terminals for message notification in electronic messaging in a mobile telecommunications network for mobile communication terminals.

BACKGROUND OF THE INVENTION

A mobile (cellular) telephone for a telecommunications system like GSM, UMTS, D-AMPS or CDMA2000 is a familiar example of a mobile communication terminal according to the above. In recent years, the scope of use of such mobile terminals has been expanded from mere voice communication to include also various additional functionality, such as electronic messaging like SMS, MMS and email. Among these types of electronic messages, SMS messages have hitherto been the most popular, partly because of their simplicity of use and bandwidth-preserving nature (an SMS message being limited to 160 characters of text).

Conventionally, receipt of an electronic message in a mobile terminal is typically indicated as shown at 510a in the upper left part of FIG. 5; a short text like "1 new message" is presented in a popup window 516 on a display 512 of the mobile terminal. The popup window also contains an envelope icon 517 to symbolize the new received message. The popup window 516 typically disappears and is replaced by other information if, for instance, the user chooses to read the new message by selecting a Read menu option 514a, or chooses not to read the message by selecting a Cancel menu option 514b, or when an incoming call is announced, etc. In addition, a contemporary mobile terminal may use an envelope icon like 517 which remains visible on the display 512 (for instance in an uppermost status indicator area 512b), as long as there are unread messages in the mobile terminal.

A drawback with the conventional way of indicating receipt of an electronic message is that the user has no way of telling from whom the message is without having to actually enter the messaging inbox and check the message itself. In many cases, for instance in meetings, this can be quite disturbing for the user, especially if the mobile terminal already has a lot of messages stored, wherein retrieval of the recently received message will take a longer time. If the user is waiting for an important message, this can be quite annoying. Thus, a problem with the prior art is that received messages are indicated anonymously as well as jointly in mobile terminals, typically in the form of a mere indication of the number of received messages and/or a single, static and anonymous envelope icon.

WO 2004/040461 discloses a communication apparatus, such as a mobile terminal, having a controller, an interface adapted to receive an electronic message, a display and a memory. The memory stores image data representing at least one predefined icon to be presented on the display so as to indicate receipt of the electronic message. Moreover, the memory stores an association between the or each predefined icon and a sender of electronic messages. The controller determines a sender of the received electronic message, matches the sender thus determined with the or each predefined icon by way of the association, and presents a matching icon, if any, on the display to indicate receipt of the electronic message as well its sender. This arrangement allows a mobile terminal user to assign a personalized icon to a another mobile terminal user, so that when an electronic message is received from such another user, the personalized icon will be shown as notification of the received message, instead of the anonymous message notification described above, thereby giving the receiving user an immediate indication of the identity of the sender.

While the approach suggested in WO 2004/040461 provides an improvement over the prior art in that it allows a potential receiver of electronic messages to customize his mobile terminal to show personalized icons when receiving messages from potential senders, it has a shortcoming in that such personalized message notification will only work if the receiver has associated the sender with a personalized icon in advance. If receiving a message from a sender for whom the receiver has not created any personalized icon association on beforehand, the receiver's terminal will have to use a standard, anonymous message notification as described above.

A related shortcoming of electronic messaging in mobile telecommunications is its insufficiency in supporting emotional expressions between sender and receiver. Recent research has shown that users of mobile terminals would like to have richer and more surprising messaging. Particularly when communicating through a narrow medium like SMS, it is often difficult to express emotions correctly and effectively. Short text messages can easily be misinterpreted. Richer communication channels (such as MMS or email) are often not very intuitive to use (e.g. in terms of inserting graphical elements as attachments to the message). Neither the message notifications, nor the messaging itself, is currently prominent as regards the ability to provide meaningful, expressive and personal messaging and message notification.

SUMMARY OF THE INVENTION

In view of the above, an objective of the invention is to solve or at least reduce the problems discussed above. More specifically, embodiments of the invention aim at providing improved personalized message notification for mobile terminals, such that senders of electronic messages can influence the way in which their messages are notified to the intended receivers. Embodiments of the invention also seek to enhance the ability to express emotions in electronic messaging for mobile terminals.

Generally, the above is achieved by methods and terminals according to the attached independent patent claims.

A first aspect of the invention is a method in electronic messaging in a mobile telecommunications network for mobile communication terminals, the method involving, in a sender terminal, the steps of:

generating an electronic message;

associating said electronic message with a message notification; and representing said electronic message and said message notification in a signal which is transmittable over said mobile telecommunications network to a receiver terminal, said signal being adapted, when received in said receiver terminal, for performance of said message notification in a user interface of said receiver terminal as a notification of the reception of said electronic message.

The signal is preferably transmittable by electronic messaging infrastructure in the mobile telecommunications network, such as electronic messaging infrastructure selected from the group consisting of: Short Message Services (SMS), Multimedia Message Services (MMS) and email.

In one embodiment, said step of associating said electronic message with a message notification and said step of representing said electronic message and said message notification in a signal involve incorporating said message notification in said electronic message, wherein said signal is said electronic message with its incorporated message notification. Advantageously, in this embodiment the message notification is incorporated in the payload of an SMS, MMS or email message, or as an attachment thereof.

In another embodiment, said step of associating said electronic message with a message notification and said step of representation said electronic message and said message notification in a signal involve incorporating a reference to said message notification in said electronic message, wherein said signal is said electronic message with its incorporated message notification reference and wherein said message notification is accessible to said receiver terminal through said message notification reference. To this end, the message notification which is referred to by said message notification reference may be predefined and stored in local memory in said receiver terminal. Alternatively, it may be predefined and stored at a remote resource available over said mobile telecommunications network, or it may be incorporated in a separate electronic message which is transmittable over said mobile telecommunications network from said sender terminal to said receiver terminal.

Advantageously, said signal is adapted for performance of said message notification by generating a perceivable effect in the user interface of the receiver terminal, said perceivable effect including at least one effect selected from the group consisting of: a visual effect, an auditory effect and a tactile effect.

For instance, a visual effect may involve displaying a graphical animation, or an icon, still image or video sequence, on a display of the receiver terminal, or changing or modifying a general color tone in its user interface (such as a color of the display background, or of certain user interface elements). An auditory effect may involve playing a sound effect or a music sequence through a loudspeaker of the receiver terminal, and a tactile effect may involve generating a buzz pattern by means of a vibrator in the receiver terminal.

In one embodiment, a plurality of possible message notifications is provided, wherein a particular message notification to be associated with the electronic message is selectable among said plurality of possible message notifications by a user of the sender terminal.

An initial step may involve assigning predefined message notifications to potential receivers of electronic messages, wherein said step of generating an electronic message involves receiving a specification from a user of said sender terminal of an intended receiver of said electronic message, and wherein said step of associating involves determining the message notification to be associated with said electronic message as one of said predefined message notifications which is assigned to the intended receiver as specified by said user.

For a message notification in the form of a graphical animation to be performed in the user interface of said receiver terminal, the method may involve:

providing a plurality of different behaviors of said graphical animation; and receiving, from the user of said sender terminal, a selection of one of said plurality of different behaviors of said graphical animation to be used when performing the message notification in the user interface of said receiver terminal.

Such plurality of different behaviors of said graphical animation may be adapted to represent different moods or emotions of the user of said sender terminal.

A second aspect of the invention is a method in electronic messaging in a mobile telecommunications network for mobile communication terminals, the method involving, in a receiver terminal, the steps of:

receiving a signal over said mobile telecommunications network from a sender terminal, said signal containing an electronic message from said sender terminal;

identifying, from said signal, a message notification which has been associated with said electronic message at said sender terminal; and performing said message notification in a user interface of said receiver terminal as a notification of the reception of said electronic message.

Advantageously, the signal is received as conveyed by electronic messaging infrastructure, such as Short Message Services (SMS), Multimedia Message Services (MMS) or email, in the mobile telecommunications network.

In one embodiment, said signal is said electronic message with said message notification incorporated therein, for instance in the payload of an SMS, MMS or email message, or as an attachment thereof.

In another embodiment, the signal is said electronic message with a reference to said message notification incorporated therein, wherein said step of identifying involves obtaining said message notification as referred to by said message notification reference. To this end, the message notification referred to by said message notification reference may be predefined and stored in local memory in said receiver terminal, or it may be predefined and stored at a remote resource available for said receiver terminal over said mobile telecommunications network. Alternatively, the method may involve receiving a separate electronic message over said mobile telecommunications network from said sender terminal, wherein the message notification, as referred to by said message notification reference, is obtained from said separate electronic message.

Advantageously, said step of performing said message notification involves generating a perceivable effect in the user interface of the receiver terminal, said perceivable effect including at least one effect selected from the group consisting of: a visual effect, an auditory effect and a tactile effect, as explained already for the first aspect of the invention.

A third aspect of the invention is a sender terminal for electronic messaging in a mobile telecommunications network for mobile communication terminals, the sender terminal comprising:

means for generating an electronic message;

means for associating said electronic message with a message notification; and means for representing said electronic message and said message notification in a signal which is transmittable over said mobile telecommunications network to a receiver terminal, said signal being adapted, when received in said receiver terminal, for performance of said message notification in a user interface of said receiver terminal as a notification of the reception of said electronic message.

A fourth aspect of the invention is a receiver terminal for electronic messaging in a mobile telecommunications network for mobile communication terminals, the receiver terminal comprising:

means for receiving a signal over said mobile telecommunications network from a sender terminal, said signal containing an electronic message from said sender terminal;

means for identifying, from said signal, a message notification which has been associated with said electronic message at said sender terminal; and means for performing said message notification in a user interface of said receiver terminal as a notification of the reception of said electronic message.

The third and fourth aspects of the invention generally have the same or corresponding features as the first and second aspects.

A fifth aspect of the invention is a system for electronic messaging in a mobile telecommunications network, the system comprising a sender terminal according to the third aspect and a receiver terminal according to the fourth aspect.

The invention has several advantages. It provides an easy way to emotionally enhance electronic messaging, particularly text-based messaging like SMS. It also offers a more personal way of messaging by selecting a personalized message notification. Therefore, it enables the receiver to identify the sender, and even his mood in some embodiments, before even opening a message from the sender. Thanks to the invention, in some embodiments electronic messaging will be more fun and like story-telling through characterization.

Other objectives, features and advantages of the present invention will appear from the following detailed disclosure, from the attached dependent claims as well as from the drawings.

BRIEF DESCRIPTION OF THE DRAWINGS

Embodiments of the present invention will now be described in more detail, reference being made to the enclosed drawings.

DETAILED DESCRIPTION OF THE INVENTION

Figure 1:
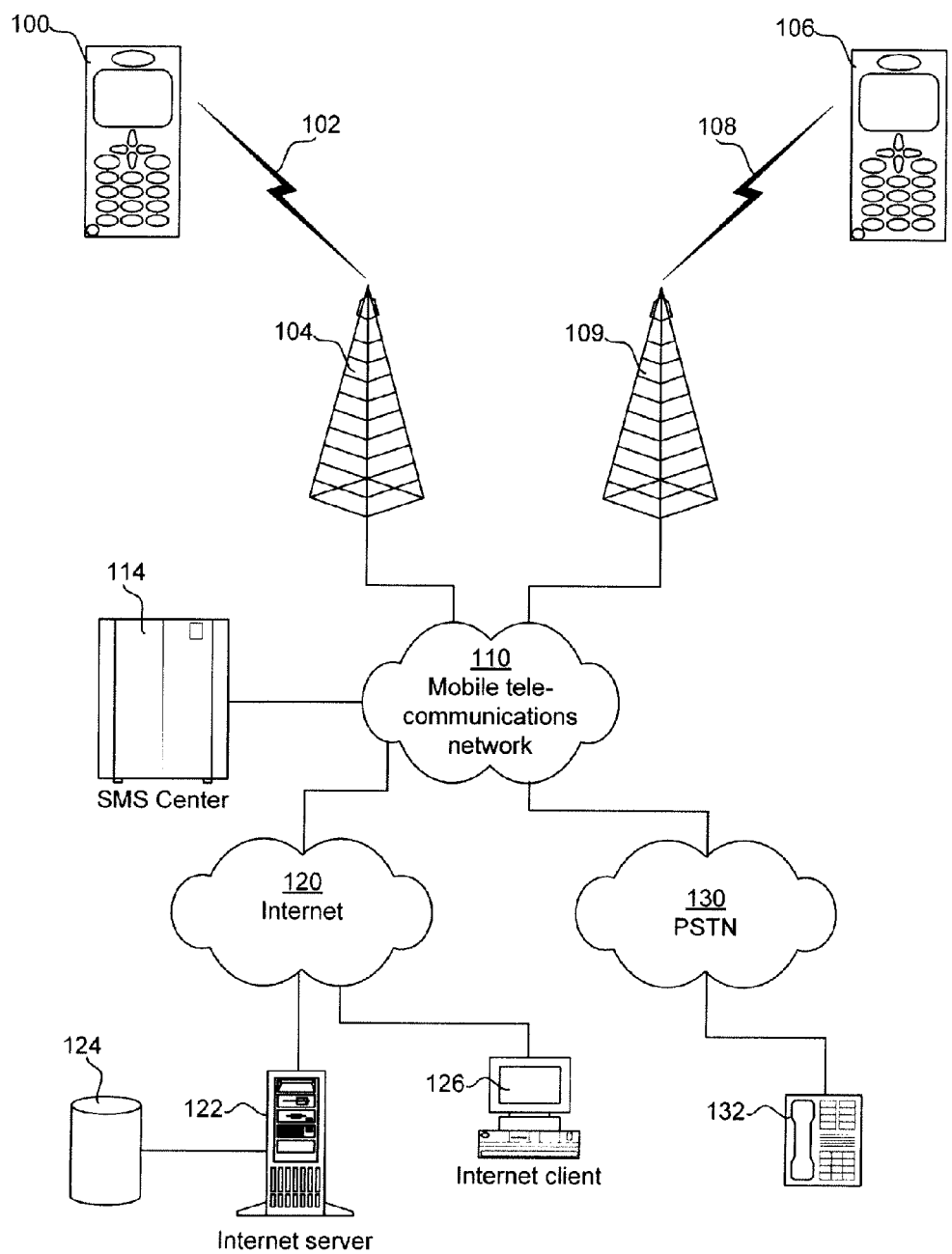
FIG. 1 is a schematic illustration of a telecommunication system, including mobile communication terminals and a mobile telecommunications network, as an example of an environment in which the present invention may be applied.

First, with reference to FIG. 1, one example of a telecommunication system in which the invention may be applied will be briefly described. Then, with reference to the remaining drawings, embodiments of the invention will be described in more detail.

In the telecommunication system of FIG. 1, various telecommunications services such as voice calls, data calls, facsimile transmissions, music transmissions, still image transmissions, video transmissions, electronic message transmissions and electronic commerce may be performed between different mobile communication terminals 100, 106. Among these services, electronic message transmissions are of particular importance for the present invention. In the following, SMS (Short Messaging Service) messages are used an one example of such electronic message transmissions, but other types of messages, including but not limited to MMS (Multimedia Messaging Service) or email messages, are also included in this concept.

The mobile terminals 100, 106 are connected to a mobile telecommunications network 110 through RF links 102 and 108 via respective base stations 104, 109. The mobile telecommunications network 110 may be any commercially available mobile telecommunications system, such as GSM, UMTS, D-AMPS or CDMA2000. The mobile terminals 100, 106 are illustrated as mobile (cellular) telephones but may alternatively be other kinds of portable devices, such as portable digital assistants (PDAs) or communicators.

A public switched telephone network (PSTN) 130 is connected to the mobile telecommunications network 110 in a familiar manner. Various telephone terminals 132 are connected to the PSTN 130.

The mobile telecommunications network 110 is operatively connected to a wide area network 120, which may be Internet or a part thereof. An Internet server computer 122 has a data storage 124 and is connected to the wide area network 120, as is an Internet client computer 126.

In a familiar manner, the mobile telecommunications network 110 is provided with an SMS center 114. Users of the mobile terminals 100, 106 may receive SMS messages from the SMS center 114 over the radio links 102, 108 and, of course, also send outgoing SMS messages to the SMS center 114. As is well known per se, an SMS message is a short electronic message that, typically, conveys a text, which has been manually entered by a user at one terminal 100, to another terminal 106 to be opened and read by another user. In one embodiment, the SMS messaging infrastructure of the mobile telecommunications network is used in a novel way for achieving sender-controlled message notification at the receiver terminal. This will be explained in more detail with reference to FIG. 2.

Figure 2:
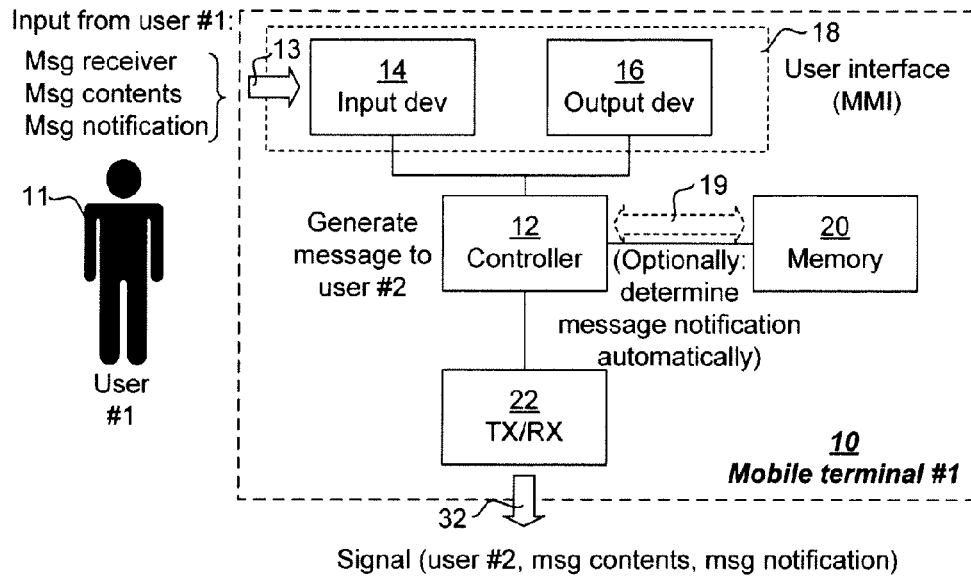
FIG. 2 schematically illustrates the principle behind the present invention for performing electronic messaging from a first mobile communication terminal to a second one, where a personalized message notification for the message is set at the sending terminal and the message notification is performed on the receiving terminal upon receipt of the message.
Figure 2:
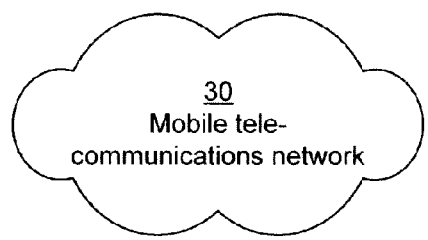
Figure 2:
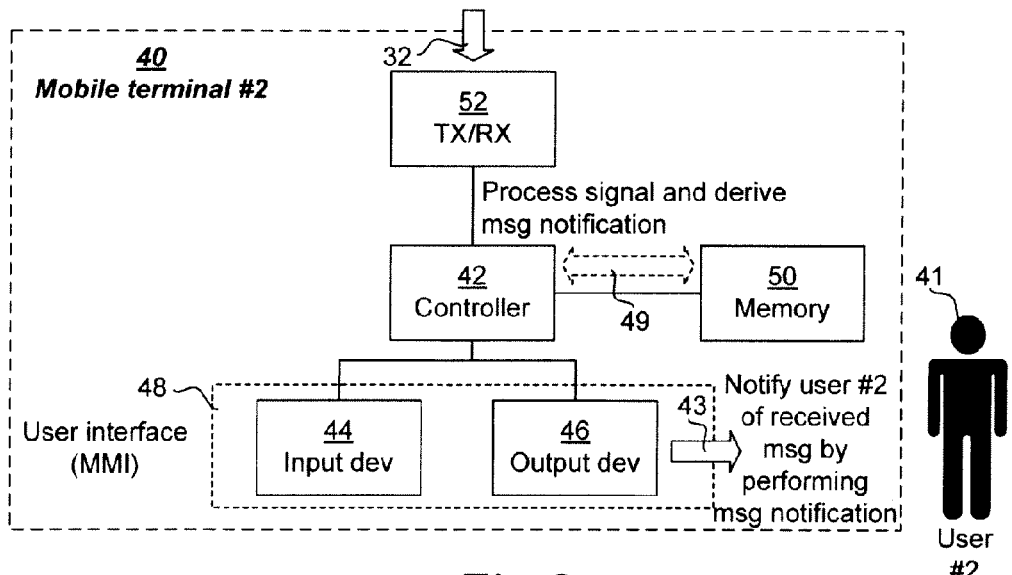

FIG. 2 illustrates communication of an electronic message from a first user 11 of a first mobile communications terminal 10 (which may be terminal 100 of FIG. 1) to a second user 41 of a second mobile communications terminal 40 (which may be terminal 106 of FIG. 1) over a mobile telecommunications network 30 (which may be network 110 of FIG. 1), in accordance with the concept of the present invention. Each mobile terminal 10/40 comprises a controller 12/42, a local memory 20/50, a transmitter/receiver 22/52 for accessing the mobile telecommunications network 30, and a user interface 18/48 including an input device 14/44 and an output device 16/46. The input device 14/44 may include a keypad of common ITU-T type (alphanumerical keypad representing characters "0"-"9", "*" and "#") as well as other keys such as soft keys and/or call handling keys. Other input means such as a four/five way navigation key and/or a joystick may also be included in the input device 14/44. The output device 16/46 may include a display, one or more LEDs, a loudspeaker (earphone) and a vibrator (buzzer).

A chain of operations will now be described for generating an electronic message with personalized message notification controlled by the first user 11 at the first terminal 10, transmitting the electronic message with its personalized message notification to the second terminal 40, and notifying the user 41 at the second terminal 40 of the received electronic message by way of the personalized message notification.

Figure 4:
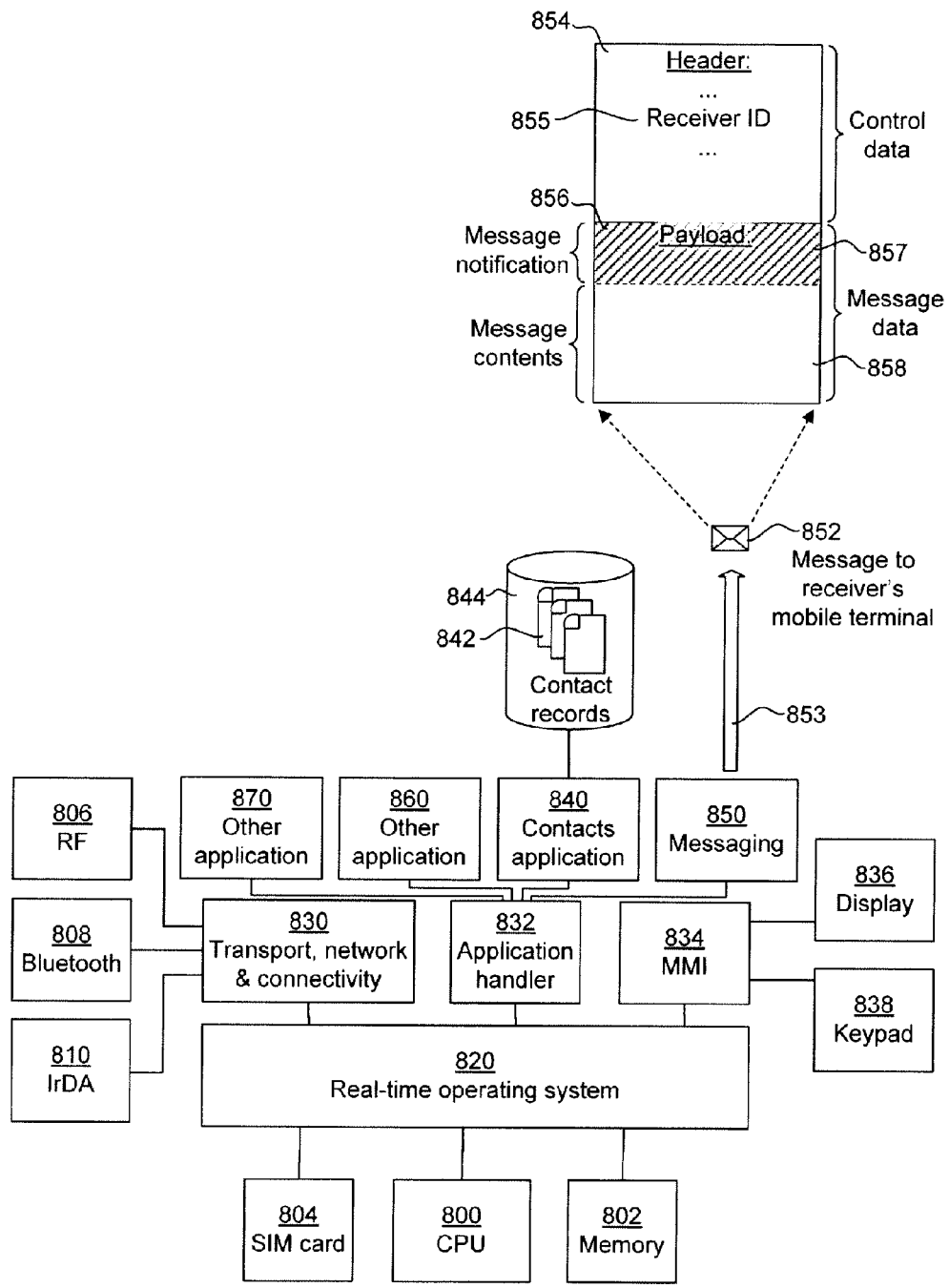
FIG. 4 is a block diagram illustrating a mobile communication terminal according to one embodiment in more detail.

First, the first user 11 enters a create new message function in a messaging application (such as 850 in FIG. 4). The first user will then be presented with a typical input form where an intended message receiver (the second user 41 in this case)

may be specified and the desired message contents may be input, as indicated at 13 in FIG. 2. This may look like the display screen snapshot 310*a* of FIG. 3, the layout of which is familiar and well known per se. A person skilled in the art appreciates that the intended message receiver will typically be specified either by selecting a desired contact record in a contacts application (such as 840 in FIG. 4), from which an appropriate receiver ID (e.g. mobile phone number for SMS/MMS, or an email address for email messaging) may be automatically fetched and provided to the messaging application, or by manually entering a sequence of characters that forms the receiver ID of the intended message receiver (e.g. entering "myreceiver@email.xx", being the email address of the second user 41). Correspondingly, the message contents may be entered by any available data input functionality, for instance multiple key presses on a keypad, digital hand-writing by means of a stylus and a touch-sensitive display screen, or tapping on a virtual keyboard with a stylus.

In addition, in accordance with the present invention, a message notification will be assigned to the electronic message already at the sender side, i.e. in the first terminal 10. In different embodiments, the message notification may be directly or indirectly controllable by the message sender, i.e. the first user 11.

"Directly controllable" may include a case where the first user 11 will actively select which message notification to use among a number of prestored message notifications in the local memory, or confirm use of a message notification which has been associated in advance with the receiver ID of the specified intended message receiver (such a predefined message notification, or a reference to it, may for instance be stored in on of the fields in a contact record 842 corresponding to the intended receiver in the contact application's data storage 844, see FIG. 8). "Directly controllable" may also include a case where the first user 11 will specify a parameter which will affect the way in which the message notification is performed to the second user 41 in the user interface 48 of the second terminal 40. Thus, in these cases, the message notification to be used is specified by the first user 11 together with the intended message receiver and desired message contents upon creation of the new electronic message, as indicated at 13 in FIG. 2.

"Indirectly controllable" may include a case where the message notification to be used, or a parameter thereof, is not specified actively by the first user 11 when the new message is created at 13 in FIG. 2, but rather determined automatically by the controller 12 by reference to the local memory 20, as indicated at 19 in FIG. 2. However, the determination of the message notification by the controller 42 is nevertheless indirectly influenced by some data input or behavior of the first user 11 in the past. For instance, in one embodiment the first user 11 may predefine the particular message notification to use, e.g. either by associating it in advance with the receiver ID of the specified intended message receiver, or by defining a common personalized message notification which is to be used for all messages from the first user 11, irrespective of who the receiver is. Such a predefined message notification will be stored in the local memory 20, and when the new message is to be generated from the first user's input 13 (in this case consisting of the intended receiver and the message contents), the controller 12 will automatically determine the message notification and represent it in an outgoing message signal 32. In another embodiment, the message notification to be used, or a parameter thereof, is determined by the controller 12 as a function of previous messaging behavior of the first user 11 (using for instance the same message notification as was used the last time a message was sent to, or received from, the particular intended receiver (second user 41), or selecting a message notification that represents the frequency of messaging between the first and second users 11, 41).

When the required information, i.e. the message receiver, the message contents and the message notification, has been obtained in any of the manners referred to above, the controller 12 generates an outgoing electronic message and controls the transmitter/receiver 22 to transmit the electronic message onto the mobile telecommunications network 30 as a signal 32 intended for receipt by the second terminal 40 and second user 41. In one embodiment, the signal 32 is an SMS message which is conveyed by the SMS messaging infrastructure (e.g. SMS center 114 of FIG. 1) in the mobile telecommunications network 30 from the first terminal 10 to the second terminal 40. As will be explained in more detail with reference to FIG. 4, the message notification may be represented in the payload section of such an SMS message.

The signal 32, e.g. the SMS message with its payload containing the message notification, is received by the transmitter/receiver 52 of the second mobile communications terminal 40. The controller 42 thereof processes the received signal, i.e. analyzes the SMS message and derives the message notification represented in the message payload. The thus derived message notification is then performed by the controller 42 in the user interface 48 to notify the second user 41 of the receipt of the SMS message in the signal 32. Depending on the nature of the message notification, this may involve generating a visual, auditory or tactile effect with the output device 46. Further examples of this will be given with reference to FIG. 4.

Once the message has been notified, it can be opened and read by the second user 41 in a familiar manner. Advantageously, the message notification associated with the message is available to the second user 41, as long as the message is kept in the second terminal 40, and may be accessed at a later time by e.g. selecting a certain menu option when the message is open, or marked in a list of messages.

Figure 5:
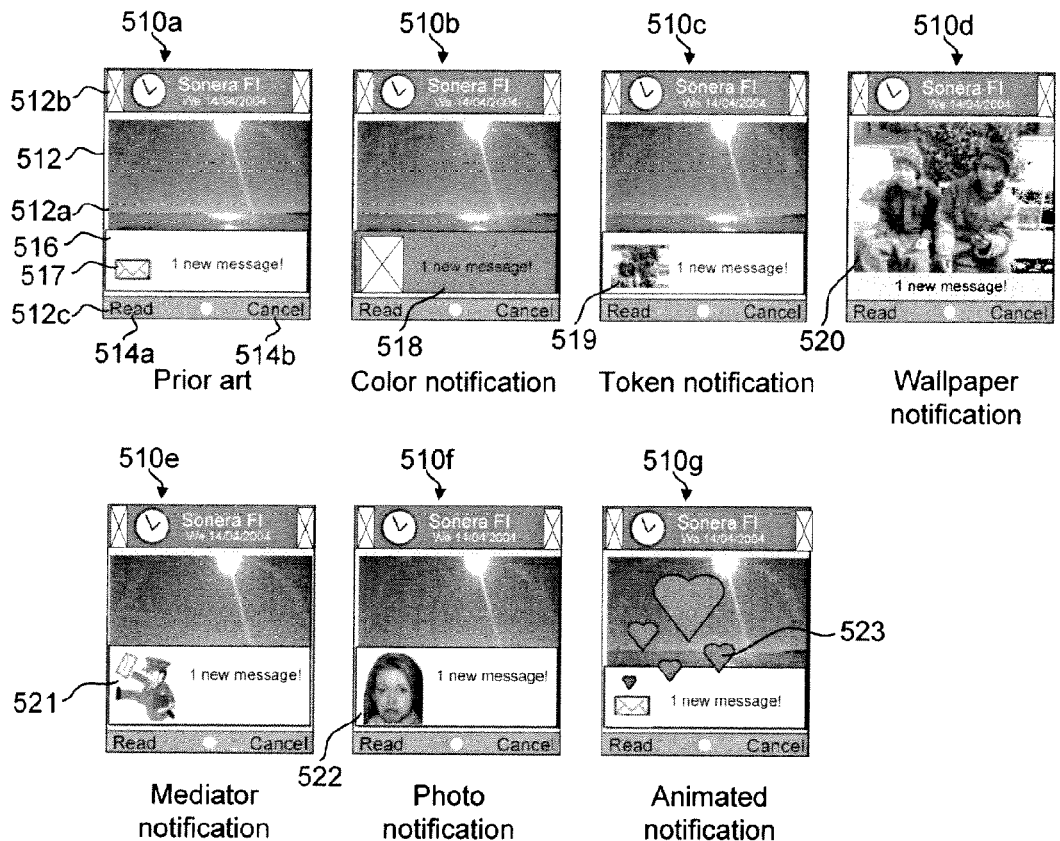
FIG. 5 illustrates different examples of personalized message notifications, sender-controlled and/or receiver-controlled.

In case no personalized message notification is associated with a received message (e.g. because the sender's mobile terminal is not provided with personalized message notification functionality, or because the sender chose not to assign a message notification to that particular message), the controller 42 will use a standard, anonymous message notification, like the envelope icon 517 at 510*a* in FIG. 5, when notifying receipt of the message at the receiver's terminal.

Figure 3:
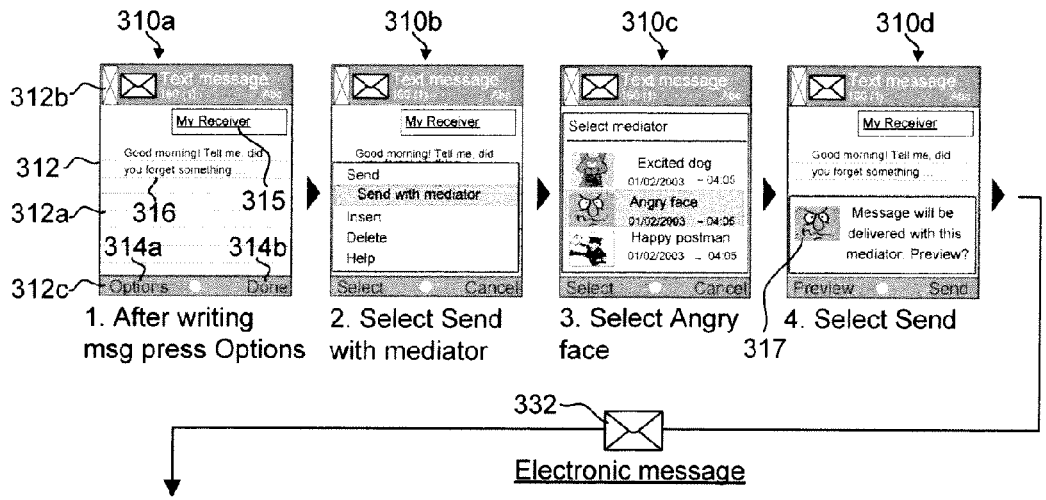
FIG. 3 illustrates an exemplifying chain of display screen snapshots from first and second mobile communication terminals when performing electronic messaging with sender-controlled message notification, like in FIG. 2.
Figure 3:
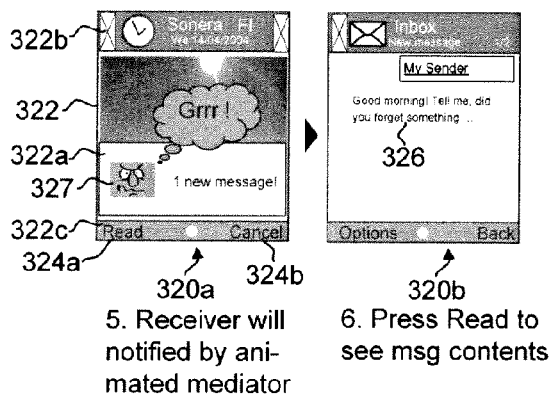

FIG. 3 illustrates an exemplifying chain of display screen snapshots 310*a-d* and 320*a-b* from a first user's terminal and a second user's terminal, respectively, when an SMS message 332 is communicated from the first user (sender) to the second user (receiver). In more detail, as seen at 310*a* and 320*a*, both the sender's display 312 and the receiver's display 322 have a disposition which is typical in the technical field; it comprises a main display area 312*a*/322*a*, an upper status indicator panel 312*b*/322*b* and a lower soft-key panel 312*c*/322*c*. The soft-key panels 312*c* and 322*c* display labels 314*a-b* and 324*a-b* for two soft keys included in the input device of the sender's terminal and the receiver's terminal, respectively.

At 310*a*, the sender has created a new SMS message and specified an intended receiver ("My Receiver") at 315, and some message contents at 316. After having completed the input, the sender selects soft key 314*b*, wherein a list of options is presented as shown at 310*b*. Here, the sender can choose, among other things, to send the message with or without a personalized message notification. If choosing to send without personalized message notification ("Send"), the message will be sent to the receiver just as any other conventional SMS message, which upon receipt at the receiver's terminal will be notified by means of a standard, anonymous message notification, like 517 at 510*a* in FIG. 5. On the other hand, if "Send with mediator" is selected, the sender will be given the opportunity to associate a personalized message notification with the message, as has been described above with reference to FIG. 2.

In FIG. 3, the personal message notifications disclosed are of a type called "mediator". A mediator is a visual message notification, such as a graphical animation or a still image or an icon, which is particularly designed to express emotions related to the sender. Advantageously, the mediator depicts an animated character which expresses a personality and/or mood. The sender can influence the mood of the mediator before sending the message. The mediator will appear as an animation on the receiver's terminal to notify receipt of the message. The character and the expressed mood of the mediator will provide an emotional context for the message and can therefore enhance the meaning of the message. A mediator can be personal or be selected between two people or a group. Mediators will make the message notification more meaningful. Users are preferably able to create or personalize their mediator(s) or download them from a service, such as Internet server 122 of FIG. 1. Alternatively, the mediator could be an independent virtual character which resides in the sender's terminal and the emotional state of which is effected by the communication behavior of the parties involved.

Referring back to the display screen snapshots of FIG. 3, after having selected "Send with mediator" at 310*b*, the user is presented with a list of available mediators at 310*c*. In case a particular mediator has already been predefined and associated with the particular receiver, the sender may instead be prompted to confirm usage of that particular mediator, or that particular mediator may be highlighted in the list shown at 310*c* for the convenience of the sender.

Instead of showing different characters in the list at 310*c* (i.e., a dog, a face and a postman), one common character may be used as mediator, such a common character preferably having a selectable parameter that controls the behavior of the character when performed at the receiver. Such a parameter may for instance represent different moods (happy, sad, angry, tired, excited, etc) of said common character.

Upon selection of a mediator 317 from the display at 310*c*, the sender is offered a preview of the selected mediator 317 at 310*d*. Another option at 310*d* is to actually have the message sent. Upon selecting "Send", the selected mediator will be represented in the thus generated SMS message 332, which is communicated as a signal over the mobile telecommunications network to the receiver's terminal, as has been described above for FIG. 2.

Upon receipt of the SMS message 332, the mediator represented therein will be derived and performed in the main display area 322*a* of the receiver's terminal 322, as a personalized message notification of the message 332, which replaces the standard message notification. The animated mediator will play with regular intervals until the receiver opens the message. By selecting a "Read" option 324*a* at 320*a*, the message contents 326 will be presented to the receiver in a manner familiar per se, as seen at 320*b*. Once the message has been opened, the mediator will be available through an Option menu of the particular message.

Reference is now made to FIG. 4, which illustrates a mobile communication terminal according to one embodiment in more detail, with particular focus on message notification in electronic messaging. The mobile communication terminal of FIG. 4 may be any one of the terminals 100, 106, 10 and 40 of FIGS. 1 and 2.

As seen in FIG. 4, a controller 800 is responsible for the overall operation of the mobile terminal and is preferably implemented by any commercially available CPU ("Central Processing Unit"), DSP ("Digital Signal Processor") or any other electronic programmable logic device. The controller 800 has associated electronic memory 802 such as RAM memory, ROM memory, EEPROM memory, flash memory, or any combination thereof. The memory 802 is used for various purposes by the controller 800, one of them being for storing data and program instructions for various software in the mobile terminal. The software includes a real-time operating system 820, a man-machine interface (MMI) module 834, an application handler 832 as well as various applications. In the illustrated example, the applications include a contacts (phonebook) application 840, a messaging application 850 (e.g. for SMS, MMS and email) as well as other applications 860, 870. The MMI module 834 includes drivers that cooperate with various MMI or input/output (I/O) devices, including a display 836 and a keypad 838. Various other I/O devices, such as a microphone, a speaker, a vibrator, a joystick, a ringtone generator, an LED indicator, etc, may cooperate with the MMI module 834. The MMI module 834 also contains software for providing a graphical user interface (GUI) to a user of the mobile terminal. Therefore, as is commonly known per se, the user may operate the mobile terminal through the man-machine interface thus formed.

The software in the mobile terminal also includes various modules, protocol stacks, drivers, etc., which are commonly designated as 830 and which provide communication services (such as transport, network and connectivity) for an RF interface 806, and optionally a Bluetooth interface 808 and an IrDA interface 810. The RF interface 806 comprises an internal or external antenna as well as appropriate radio circuitry for establishing and maintaining a wireless link to a base station (e.g. the link 102/108 and base station 104/109 in FIG. 1). As is well known to a man skilled in the art, the radio circuitry comprises a series of analogue and digital electronic components, together forming a radio receiver and transmitter. These components include, inter alia, band pass filters, amplifiers, mixers, local oscillators, low pass filters, AD/DA converters, etc.

The mobile terminal also has a SIM card 804 and an associated reader. As is commonly known, the SIM card 804 comprises a processor as well as local work and data memory.

The contacts application 840 handles a plurality of contact entries or records 842, which are stored in a data storage 844 which may be physically accommodated in the memory 802. Each contact entry 842 has data fields with information on the represented person's name and mobile phone number, plus preferably other information such as other phone numbers, postal address, email address, VAD (Voice-Activated Dialing) data, etc.

The messaging application 850 provides messaging services such as SMS, MMS and email. The user of the mobile terminal may thus generate for instance a text-based SMS message by inputting the desired text through the keypad 838, designate an intended receiver by e.g. referring to one of the contact entries 842 of the contacts application 840, associate the SMS message with a personalized message notification, and have the text-based SMS message sent via modules 830 and 806 over the mobile communications network and the messaging infrastructure therein (e.g. network 110 and SMS center 114 of FIG. 1), so as to ultimately arrive at the intended receiver's mobile terminal.

The composition of a typical outgoing SMS message 852 in one embodiment of the invention is illustrated in FIG. 4. The SMS message 852 has a control data portion 854 and a message data portion 856. The control data portion 854 occupies 120 octets and contains various protocol layer-specific and message type-specific control data, including a specification of the receiver ID (phone number) 855 of the intended receiver. For details about the format of SMS messages, reference is made to available standards for 2 G, 2.5 G and 3 G mobile telecommunications systems. For instance, the SMS service for 3 G systems is described in detail in "3GPP TS 24.011", which is available at http://www.3gpp.org/.

The message data portion 856 occupies 140 octets and contains the payload of the SMS message, i.e. the actual message contents 858. In addition, the message data portion also represents the message notification 857 which has been associated with the outgoing SMS message 852 by the sender. In one embodiment, particularly suited for simple message notifications that can be represented by digital data occupying far less than 140 octets, the actual digital data of the message notification (e.g. digital image data defining an icon) may be stored at 857 in the message's payload 856. This will of course reduce the storage space left for the message contents 858 and consequently limit the maximum number of characters of the message contents to a number less than the ordinary 160 7-bit characters.

Therefore, in some embodiments, to minimize such a reduction in the maximum number of message characters, only a reference to the actual digital data defining the message notification is stored in the message payload at 857, but not the entire actual digital data. This is particularly advantageous for more complex message notifications, such as graphical animations like the mediator of FIG. 3. Such a reference may be an index to an ordered structure of sets of digital data defining respective message notifications, wherein these sets of digital data are a) stored locally in the receiver's terminal (requires some advance synchronization of the sender and receiver terminals to make sure that they both contain the same sets of digital data defining the same message notifications, b) stored at a remote location (such as Internet server 122 or a resource in the mobile telecommunications network) which is accessible to both terminals, or c) conveyed outside of the message payload 856 of the particular SMS message 852 (e.g. in the control data portion 856 of message 852, or in separate SMS message(s) following message 852 in cascade).

In embodiments that use MMS instead of SMS, the message notification may advantageously be represented as an embedded media object within such an MMS message. To this end, the header (control data portion) of the MMS message may contain a particular reference to the media object to allow the receiver terminal to discriminate such an MMS message with embedded message notification from conventional MMS messages, thereby allowing the receiver terminal to automatically derive the media object and use it as message notification upon receipt of the MMS message. Correspondingly, in embodiments that use email, e.g. mobile terminals having an email client capable of receiving emails according to the POP3 or IMAP4 protocol and sending emails according to the SMTP protocol, the message notification may be represented in an attachment to such an email message.

Reference is now made to FIG. 5, which illustrates different examples 510b-510g of personalized message notifications 518-523 according to different embodiments of the invention.

510b illustrates personalized message notification by using different colors 518 of the popup window 516 shown for the envelope icon 517 in the main display area 512a of the receiver's terminal display 512.

510c illustrates personalized message notification based on an agreement or token 519 between different users of mobile terminals who have agreed to use a common message notification, like a picture of two friends, for messages between such users.

510d illustrates that personalized message notification can be performed by changing the background (wallpaper) 520 of the receiver's terminal display.

510e shows personalized message notification in the form of an animated character 521, like the aforedescribed mediator.

510f illustrates personalized message notification in the form of a photo 522 of the facial expression of the sender before sending the message.

510g illustrates personalized message notification in the form of an animation, elements 523 of which remain on the display 512 even after the original notification has ended.

The various personalized message notifications 518-523 disclosed in FIG. 5 may be sender-controlled, as has been the case with the embodiments described with reference to the previous drawings. Additionally or alternatively, they may be receiver-controlled. In the latter case, a potential receiver of electronic messages may define one or more personalized message notifications to be used when notifying an incoming message instead of the standard, anonymous message notification 517 at 510a. The potential receiver of electronic messages may associate different personalized message notifications with different potential senders of electronic messages, thereby improving the receiver's ability to immediately interpret who the sender is upon perceiving a particular personalized message notification when receiving a message from that sender.

Figure 6:
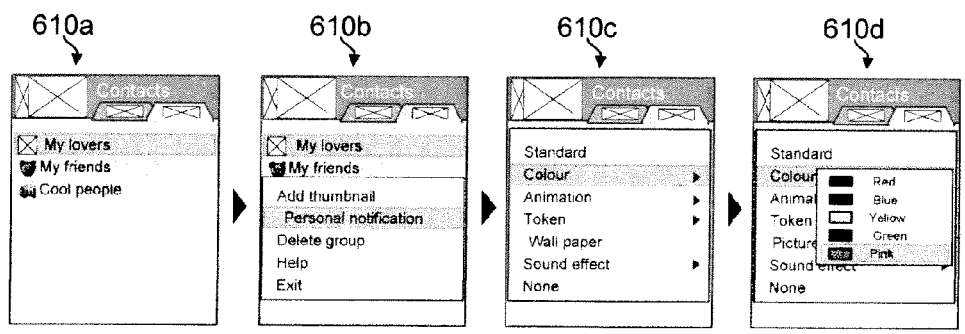
FIG. 6 illustrates an exemplifying chain of display screen snapshots when personalizing message notification at the receiver side.

FIG. 6 illustrates an exemplifying chain of display screen snapshots when personalizing message notification at the receiver side, using different colors to represent different potential senders of electronic messages. As seen at 610a, personal notification can be set by selecting an entry or group of entries in a Contacts list of the mobile terminal, followed by selecting a Personal notification item (610b) in the Options menu. Then, the user is presented with a list of different styles of notifications (610c and d). From now on the selected style will be used as notification, as shown at 510b in FIG. 5, for the selected entry or group of entries from the Contacts list. Different styles of notifications could be used for different entries or groups in the Contacts list.

The description above has referred to use cases where the sender associates a message notification with a single receiver. However, the invention may just as well be applied to a case where the sender chooses a group of receivers and associates a message notification with all members of this group.

The invention has mainly been described above with reference to a number of embodiments. However, as is readily appreciated by a person skilled in the art, other embodiments than the ones disclosed above are equally possible within the scope of the invention, as defined by the appended patent claims.

The invention claimed is:

1. A method comprising:
    generating an electronic message with a mobile communication terminal of a sender in a mobile telecommunications network;
    associating said electronic message with a message notification in the sender's mobile communication terminal; and
    transmitting said electronic message and said message notification in a signal from the sender's mobile communication terminal over said mobile telecommunications network to a receiver terminal, said signal being configured, when received in said receiver terminal, to present said message notification in a user interface of said receiver terminal as a notification of the reception of said electronic message;

wherein associating said electronic message with a message notification and transmitting said electronic message and said message notification in a signal involve incorporating a reference to said message notification in said electronic message, wherein said signal is said electronic message with its incorporated message notification reference and wherein said message notification is accessible to said receiver terminal through said message notification reference.

2. The method as defined in claim 1, wherein said signal is transmittable by electronic messaging infrastructure in the mobile telecommunications network.

3. The method as defined in claim 2, wherein said electronic messaging infrastructure is selected from the group consisting of: Short Message Services (SMS), Multimedia Message Services (MMS) and email.

4. The method as defined in claim 1, wherein said step of associating said electronic message with a message notification and said step of representing said electronic message and said message notification in a signal involve incorporating said message notification in said electronic message, wherein said signal is said electronic message with its incorporated message notification.

5. The method as defined in claim 1, wherein said message notification which is referred to by said message notification reference is predefined and stored in local memory in said receiver terminal.

6. The method as defined in claim 1, wherein said message notification which is referred to by said message notification reference is predefined and stored at a remote resource available over said mobile telecommunications network.

7. The method as defined in claim 1, wherein said message notification which is referred to by said message notification reference is incorporated in a separate electronic message which is transmittable over said mobile telecommunications network from said sender terminal to said receiver terminal.

8. The method as defined in claim 1, wherein said signal is adapted for performance of said message notification by generating a perceivable effect in the user interface of the receiver terminal, said perceivable effect including at least one effect selected from the group consisting of: a visual effect, an auditory effect and a tactile effect.

9. The method as defined in claim 8, wherein the visual effect includes a graphical animation.

10. The method as defined in claim 1, wherein a plurality of possible message notifications is provided, and wherein a particular message notification to be associated with the electronic message is selectable among said plurality of possible message notifications by a user of the sender terminal.

11. The method as defined in claim 1, involving an initial step of assigning predefined message notifications to potential receivers of electronic messages, wherein said step of generating an electronic message involves receiving a specification from a user of said sender terminal of an intended receiver of said electronic message, and wherein said step of associating involves determining the message notification to be associated with said electronic message as one of said predefined message notifications which is assigned to the intended receiver as specified by said user.

12. The method as defined in claim 11, wherein the message notification determined in said step of associating is adapted to cause a visual effect in the form of a graphical animation when performed in the user interface of said receiver terminal, the method involving:

providing a plurality of different behaviors of said graphical animation; and receiving, from the user of said sender terminal, a selection of one of said plurality of different behaviors of said graphical animation to be used when performing the message notification in the user interface of said receiver terminal.

13. The method as defined in claim 12, wherein said plurality of different behaviors of said graphical animation is adapted to represent different moods or emotions of the user of said sender terminal.

14. A method in electronic messaging in a mobile telecommunications network for mobile communication terminals, the method involving, in a receiver terminal:

receiving a signal over said mobile telecommunications network from a sender terminal, said signal containing an electronic message and a message notification from said sender terminal;

identifying, from said signal, the message notification which has been associated with said electronic message at said sender terminal; and performing said message notification from the sender terminal in a user interface of said receiver terminal as a notification of the reception of said electronic message in the receiver terminal;

wherein identifying said electronic message associated with a message notification and receiving said electronic message and said message notification in a signal involve receiving a reference to said message notification that is incorporated in said electronic message, wherein said signal is said electronic message with its incorporated message notification reference and wherein said message notification is accessible to said receiver terminal through said message notification reference.

15. The method as defined in claim 14, wherein said signal is received as conveyed by electronic messaging infrastructure in the mobile telecommunications network.

16. The method as defined in claim 15, wherein said electronic messaging infrastructure is selected from the group consisting of: Short Message Services (SMS), Multimedia Message Services (MMS) and email.

17. The method as defined in claim 14, wherein said signal is said electronic message with said message notification incorporated therein.

18. The method as defined in claim 14, wherein said signal is said electronic message with a reference to said message notification incorporated therein, and wherein said step of identifying involves obtaining said message notification as referred to by said message notification reference.

19. The method as defined in claim 18, wherein the message notification referred to by said message notification reference is predefined and stored in local memory in said receiver terminal.

20. The method as defined in claim 18, wherein the message notification referred to by said message notification reference is predefined and stored at a remote resource available for said receiver terminal over said mobile telecommunications network.

21. The method as defined in claim 18, involving:
  receiving a separate electronic message over said mobile telecommunications network from said sender terminal; and
  obtaining the message notification, as referred to by said message notification reference, from said separate electronic message.

22. The method as defined in claim 14, wherein said step of performing said message notification involves generating a perceivable effect in the user interface of the receiver terminal, said perceivable effect including at least one effect selected from the group consisting of: a visual effect, an auditory effect and a tactile effect.

23. The method as defined in claim 22, wherein the visual effect includes a graphical animation.

24. An apparatus comprising:
  means for generating an electronic message in a sender terminal of a mobile telecommunications network;
  means for associating said electronic message with a message notification in the sender terminal; and
  means for representing said electronic message and said message notification in a signal which is transmittable over said mobile telecommunications network from the sender terminal to a receiver terminal, said signal being adapted, when received in said receiver terminal, for performance of said message notification from the sender terminal in a user interface of said receiver terminal as a notification of the reception of said electronic message;
  wherein said means for associating said electronic message with a message notification and said means for representing said electronic message and said message notification in a signal involve incorporating a reference to said message notification in said electronic message, wherein said signal is said electronic message with its incorporated message notification reference and wherein said message notification is accessible to said receiver terminal through said message notification reference.

25. An apparatus comprising:
  means for receiving a signal over a mobile telecommunications network from a sender terminal, said signal containing an electronic message and message notification associated with the electronic message at said sender terminal;
  means for identifying, from said signal, the message notification from the sender terminal which has been associated with said electronic message at said sender terminal; and
  means for performing said message notification from the sender terminal in a user interface of apparatus as a notification of the reception of said electronic message, wherein the apparatus is a receiver terminal;
  wherein said means for identifying said electronic message associated with a message notification and said means for receiving said electronic message and said message notification in a signal involve receiving a reference to said message notification that is incorporated in said electronic message, wherein said signal is said electronic message with its incorporated message notification reference and wherein said message notification is accessible to said receiver terminal through said message notification reference.

26. A system for electronic messaging in a mobile telecommunications network, the system comprising a sender terminal, and a receiver terminal,
  said sender terminal including:
  means for generating an electronic message;
  means for associating said electronic message with a message notification in the sender terminal; and
  means for representing said electronic message and said message notification in a signal which is transmittable over said mobile telecommunications network to said receiver terminal, said signal being adapted, when received in said receiver terminal,
  for performance of said message notification in a user interface of said receiver terminal as a notification of the reception of said electronic message, and
  said receiver terminal including:
  means for receiving the signal over said mobile telecommunications network from said sender terminal, said signal containing the electronic message, and message notification from said sender terminal;
  means for identifying, from said signal, the message notification which has been associated with said electronic message at said sender terminal; and
  means for performing said message notification in a user interface of said receiver terminal as a notification of the reception of said electronic message;
  said means for associating said electronic message with a message notification and said means for representing said electronic message and said message notification in a signal involve incorporating a reference to said message notification in said electronic message, wherein said signal is said electronic message with its incorporated message notification reference and wherein said message notification is accessible to said receiver terminal through said message notification reference.

* * * * *

UNITED STATES PATENT AND TRADEMARK OFFICE
CERTIFICATE OF CORRECTION

| | | |
|---|---|---|
| PATENT NO. | : 8,116,740 B2 | Page 1 of 1 |
| APPLICATION NO. | : 11/232413 | |
| DATED | : February 14, 2012 | |
| INVENTOR(S) | : van der Haar et al. | |

It is certified that error appears in the above-identified patent and that said Letters Patent is hereby corrected as shown below:

Column 3
Line 9, "representation" should read --representing--.

Column 7
Line 32, "stored in on of" should read --stored in one of--.

Signed and Sealed this
Twenty-seventh Day of November, 2012

David J. Kappos
*Director of the United States Patent and Trademark Office*